United States Patent [19]

Beckham

[11] 3,967,723

[45] July 6, 1976

[54] MATERIAL HANDLING APPARATUS

[75] Inventor: Robert R. Beckham, Toledo, Ohio

[73] Assignee: Libbey-Owens-Ford Company, Toledo, Ohio

[22] Filed: July 14, 1975

[21] Appl. No.: 595,555

[52] U.S. Cl. .............................. 198/235; 198/35; 198/40; 198/261; 198/285; 214/1 QA; 271/65

[51] Int. Cl.² ......................................... B65G 47/24

[58] Field of Search .............. 198/35, 40, 234, 235, 198/248, 257, 261, 262, 267, 282, 283, 284, 285; 214/1 Q, 1 QA, 1 QB, 1 QD, 1 QE, 6 R, 6 F; 271/65, 186; 270/58

[56] References Cited
UNITED STATES PATENTS

| 2,667,259 | 1/1954 | Parker | 198/35 |
|---|---|---|---|
| 3,034,632 | 5/1962 | Wampler | 198/284 |
| 3,067,853 | 12/1962 | Carson et al. | 198/35 |
| 3,074,530 | 1/1963 | Rosenleaf | 198/35 |

Primary Examiner—Evon C. Blunk
Assistant Examiner—Joseph E. Valenza
Attorney, Agent, or Firm—Collins, Oberlin & Darr

[57] ABSTRACT

A turnover apparatus for inverting a first sheet and placing it horizontally upon a second sheet as said sheets are carried along a horizontal path. The apparatus includes lifting arms for raising the leading edge of the first sheet about its trailing edge and lowering arms for receiving the leading edge of the lifted sheet from the lifting arms and lowering the sheet when the same reaches a substantially vertical position. The transfer of the sheet from the lifting arms to the lowering arms is responsive to the position of either of the arms when handling relatively wide sheets or to the vertical disposition of said sheet when handling relatively narrow sheets.

19 Claims, 12 Drawing Figures

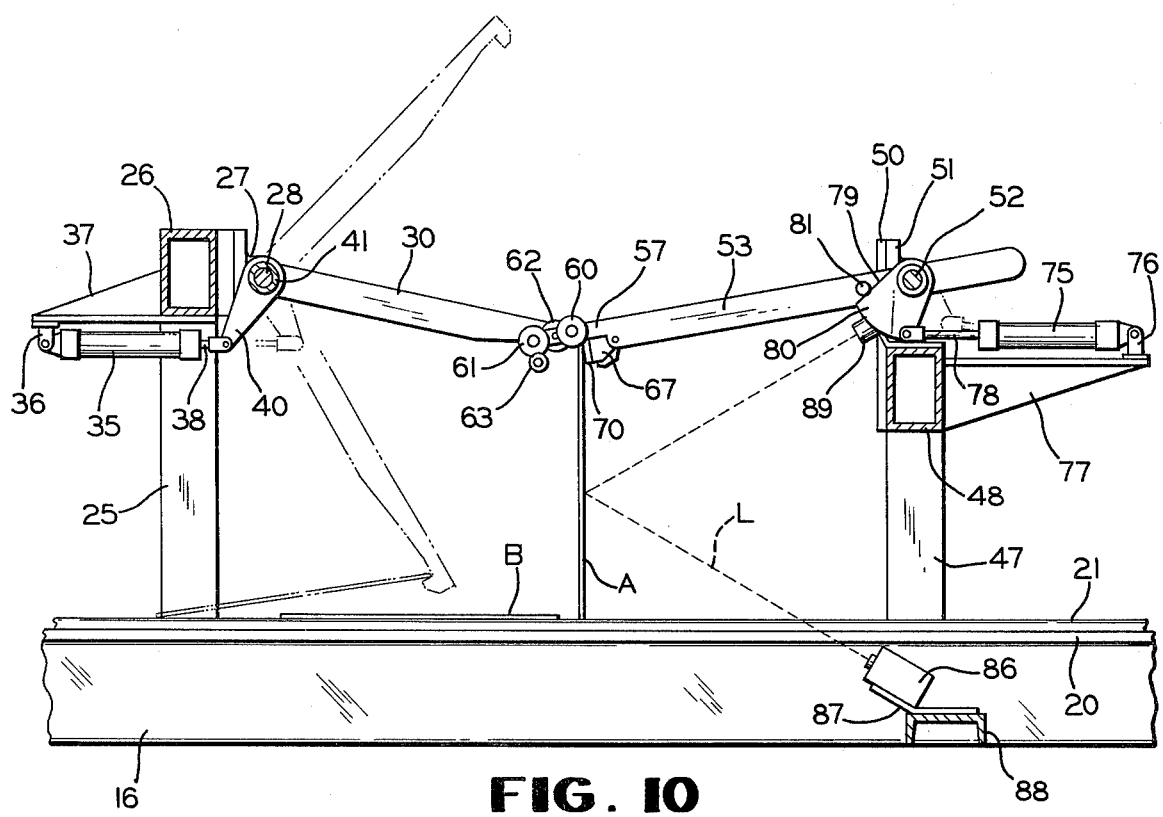

MATERIAL HANDLING APPARATUS

BACKGROUND OF THE INVENTION

The present invention relates generally to an apparatus for handling sheet material and, more particularly, to an apparatus for turning and inverting sheet material.

In the production of bent laminated glass products, such as present day automotive windshields for example, it is common practice to achieve the desired configuration by bending flat sheets of glass in pairs to the contour of a mold. Prior to the actual bending, the sheets are thoroughly cleaned and dried and a surface of at least one and preferably both of the sheets has applied thereto a coating of a water soluble parting material to prevent the sheets from fusing to one another when heated during the bending process. The sheets are then placed, one upon the other, with the parting material therebetween and their edges aligned in preparation for bending.

In a mass production operation, pairs of glass sheets are carried horizontally, or in the flat position, in a spaced relation on a conveyor through the various steps of the process including the step of inverting the first sheet of each pair and laying it upon the second sheet. Such an operation is disclosed in U.S. Pat. Nos. 3,034,632 and 3,067,853, assigned to the same assignee as the present invention.

While the sheet turnover apparatus disclosed in these patents are admirably suited for their intended purpose, they are designed to handle only one size of sheet at any given time and changeover for a run of differently sized sheets requires production line shutdown and delays to effect the necessary adjustments for accommodating differently sized sheets. It can be appreciated that this especially poses problems when handling sheets for jobber requirements, wherein only a limited number of any one size of paired sheets of a plurality of variously sized paired assemblies are processed for a short period of time.

OBJECTS AND ADVANTAGES

Accordingly, the object of the present invention is to provide an improved sheet handling apparatus for accommodating differently sized sheet material without interruption in a continuous production line operation.

It is another object of this invention to provide in the foregoing sheet handling apparatus means automatically operable for accommodating differently sized pairs of sheets in which one sheet of a given pair is inverted and placed horizontally upon the second sheet as said sheets are carried along a horizontal path.

The foregoing and other objects, advantages, and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 10 is a view similar to FIG. 8, showing the turnover apparatus in use in handling relatively narrow sheet material;

FIG. 11 is a diagrammatic illustration of an electric control circuit for use with the apparatus of this invention; and, FIG. 12 is a schematic illustration showing the lifting arms and the lowering arms in various operative positions actuating the limit switches incorporated in the control circuit.

DESCRIPTION OF THE PREFERRED EMBODIMENT

Figure 1:
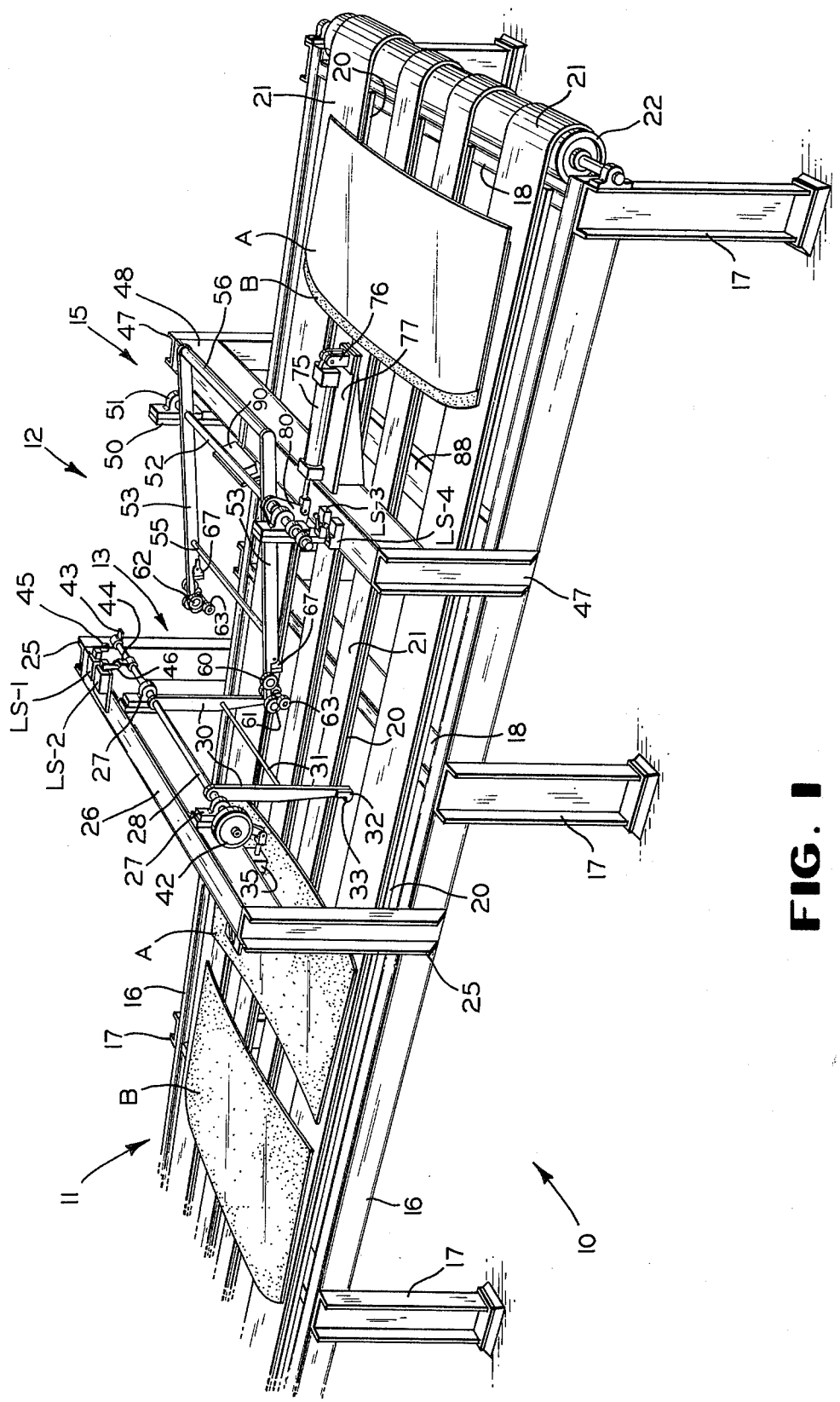
FIG. 1 is a perspective view of a sheet handling apparatus incorporating the turnover apparatus constructed in accordance with this invention.
Figure 4:
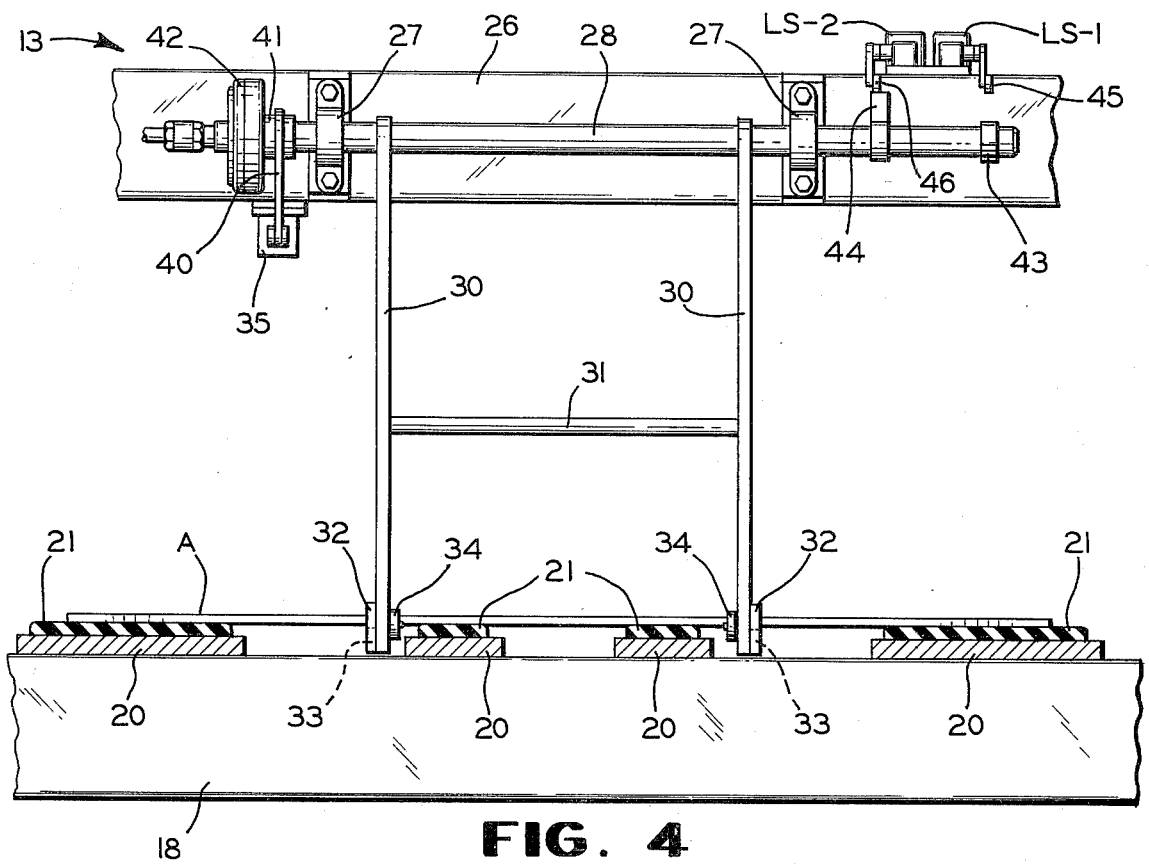
FIG. 4 is a vertical sectional view taken along the line 4—4 of FIG. 3.
Figure 5:
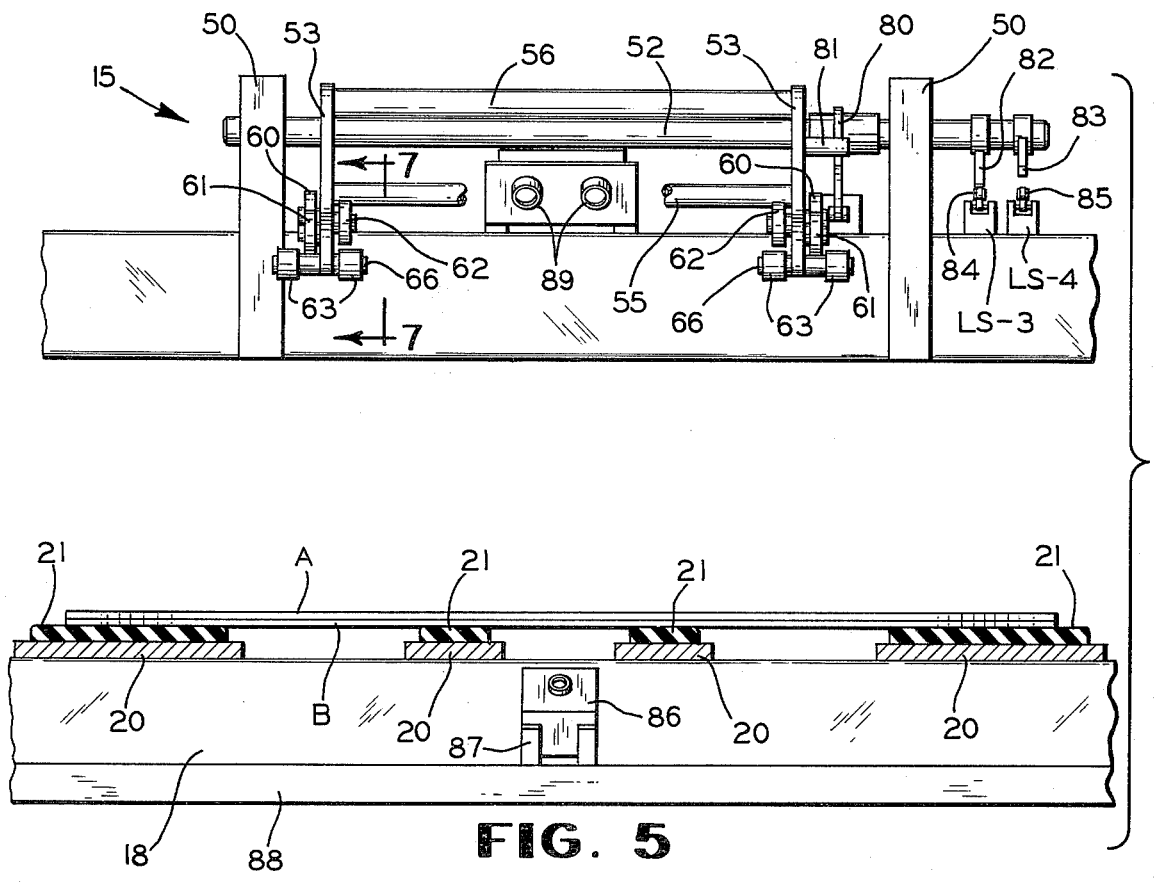
FIG. 5 is a vertical sectional view taken along the line 5—5 of FIG. 3.

Referring now in detail to the illustrative embodiment depicted in the drawings, there is shown in FIG. 1 a sheet handling apparatus, comprehensively designated 10, including a horizontal conveyor, generally designated 11, along which is mounted a sheet turnover apparatus, generally designated 12, constructed in accordance with this invention, and comprising a lifting assembly 13 and a lowering assembly 15. The conveyor 11 comprises longitudinally extending, laterally spaced, side rails 16 supported on legs 17, the opposite side rails 16 being connected by a series of cross rails 18. Mounted upon the cross rails 18 are spaced, parallel, longitudinally extending slats 20 which serve as guides or runways for the upper flights or active runs of laterally spaced endless belts 21 as best seen in FIGS. 4 and 5. The endless belts 21 pass over and are driven by rolls 22 mounted at the opposite ends of conveyor 11 (only one of which is shown in FIG. 1) and connected to a suitable power source for rotation in a manner to cause the upper flights or active runs of the endless belts 21 to move in a generally left-to-right direction as viewed in FIGS. 1, 2 and 3.

Identical, but oppositely oriented, sheets of glass to be treated are placed upon the conveyor 11 in pairs for continuous advancement thereon, the leading sheet of each pair being identified by the letter A and the trailing sheet by the letter B. The endless belts 21 carry the closely spaced sheets A and B through a spray station (not shown) wherein a suitable parting agent is applied to the upper surface of one or both sheets to prevent them from sticking when subsequently stacked and heated during the bending operation. After being sprayed, the sheets are advanced to the turnover apparatus 12 which is effective to turn or invert the coated lead sheet A of each pair of sheets upon its paired sheet B to place the sheets in the proper nested condition for subsequent bending.

The sheet lifting means or assembly 13 of turnover apparatus 12 comprises a pair of uprights 25 mounted on and extending upwardly from side rails 16. A transversely extending structural support member 26 extends between the uprights 25 and is secured at its opposite ends thereto. A pair of laterally spaced bearing blocks 27 are mounted on one face of cross support member 26 for receiving a shaft 28 journalled for rotation in the bearing blocks 27. A pair of laterally spaced lifting arms 30 are rigidly secured at their one ends to shaft 28 inwardly of bearing blocks 27 and are connected together by a tie rod 31 for pivotal movement in unison with shaft 28. The other or lower ends of arms 30 are provided with hooks 32 that normally extend vertically downwardly toward the openings between the spaced, parallel, endless belts 21. These hooks 32 are formed with fingers 33 normally disposed in the spaces between adjacent longitudinally extending belts 21 and face towards the oncoming sheets just below the lower surfaces of such sheets. As the oncoming sheets reach lifting assembly 13, the leading edge of sheet A encounters the hooks 32 with the fingers 33 engaging the lower surface of sheet A. As sheet A continues to advance, it causes the arms 30 to pivot about the axis of shaft 28 whereby the fingers 33 will raise the leading edge of sheet A, which pivots about its trailing edge resting on the advancing endless belts 21.

A roller 34 is rotatably mounted on hook portion 32 of each arm 30 with the peripheral surface thereof projecting into the area defined by the right angularly related hook portion 32 and finger 33 to facilitate sliding movement of the leading edge of sheet A as it is lifted upwardly by the arms.

Means are provided for rotating shaft 28, such means comprising a single acting, spring return, fluid cylinder 35 secured, as by a lug 36, at its cylinder end to a bracket 37 mounted on cross support member 26. The cylinder 35 is provided with a suitable piston connected to a piston rod 38 secured to the distal end of a crank lever 40 mounted on a reduced diameter portion 41 of an air clutch 42 mounted on shaft 28 adjacent one end thereof. The clutch 42 is operative to engage the crank lever 40 with shaft 28 for rotating the same by means of cylinder 35 and to disengage crank 40 from shaft 28 to allow the arms 30 to hang freely and be lifted by the leading sheet A.

Figure 6:
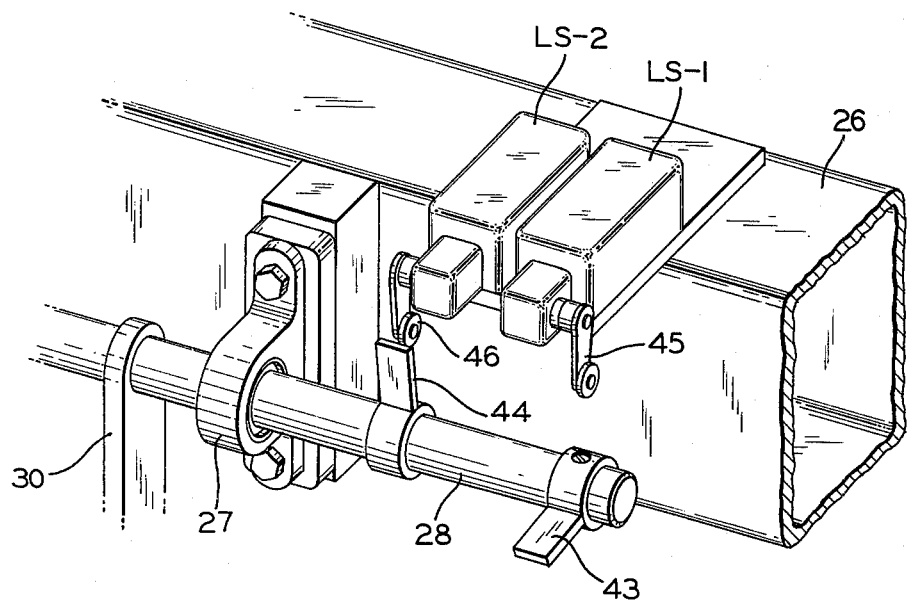
FIG. 6 is an enlarged fragmentary perspective view, showing details of the control switching means for the lifting arms.

Also mounted on shaft 28 adjacent the end remote from clutch 42 is a pair of laterally spaced switch actuating levers 43 and 44 adapted to engage actuators 45, 46 of limit switches LS-1 and LS-2, respectively, mounted on cross support member 26. These levers 43 and 44 extend radially outwardly from shaft 28 and are circumferentially offset from each other, as best shown in FIG. 6, for a purpose hereinafter more fully explained.

The sheet lowering means or assembly 15 of turnover apparatus 12 comprises a pair of uprights 47 mounted on and extending upwardly from side rails 16. A transversely extending cross support member 48 extends between and is rigidly secured at its opposite ends to the uprights 47. A pair of generally upright brackets 50 are mounted on the front face of cross support member 48 and extend upwardly therefrom for supporting bearing blocks 51 in which is journalled a rotatable shaft 52. A pair of laterally spaced lowering arms 53 is rigidly secured to the shaft 52 and are connected together in spaced relation by a brace member or tie rod 55 for pivotal movement in unison along with shaft 52. A counterweight in the form of a rod 56 is secured at its opposite ends to the rear ends of arms 53. It should be noted that the arms 53 are only partially counterbalanced, enough to reduce their loading on the glass edge but still permitting the arms 53 to fall of their own weight and operate their associated limit switches LS-3 and LS-4.

Figure 7:
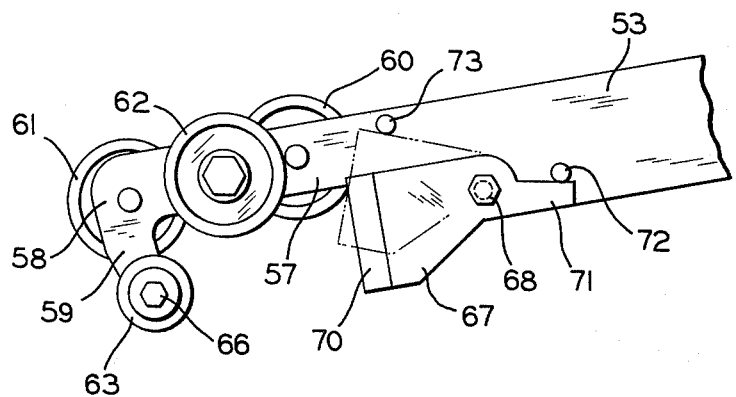
FIG. 7 is an enlarged fragmentary elevational view, looking in the direction of arrow 7—7 in FIG. 5.

As best shown in FIG. 7, the other or distal end of each lowering arm 53 is formed with a finger portion 57 terminating in a right angularly related hook 58 having a swept-back end portion 59. A pair of longitudinally spaced idler wheels 60 and 61 are mounted on one side of finger portion 57 and a third idler wheel 62 is mounted on the opposite side thereof intermediate the axes of wheels 60 and 61. A pair of smaller diameter rollers 63 are mounted on the opposite ends of a shaft 66 extending through the hook end portion 59 adjacent the distal end thereof.

Also carried by each lowering arm 53 adjacent the finger 57 is a dog 67 mounted for pivotal movement relative thereto about a pin 68. The forward portion of dog 67 is provided with an abutment member in the form of a pad 70 formed of rubber or any other suitable resiliently yieldable material and the rear portion is provided with an extension 71 engageable with a stop 72 for limiting counterclockwise movement of the dog 67. A stop 73 is adapted to be engaged by the rear face of dog 67 for limiting clockwise movement thereof.

While the lowering arms 53 are freely rotatable along with shaft 52, they normally are positioned in a downwardly directed orientation at a slight angle, approximately 15° for example, relative to and below a true horizontal plane cut through shaft 52 and are set in such a position by means of a single acting, spring return, fluid cylinder 75 connected, as by means of a lug 76, to a support bracket 77 rigidly secured to cross support member 48. The cylinder 75 is provided with the usual piston connected to a piston rod 78 attached to a sector plate 80 rotatably mounted on shaft 52 for rotation relative thereto. Fluid under suitable pressure is applied to the cylinder piston to extend rod 78 outwardly and rotate sector plate 80 in a clockwise direction to bring the leading edge 79 thereof against a pin 81 formed on the adjacent lowering arm 53 to pivot the arms through the desired angular extent and then maintain said arms 53 in such position, hereinafter referred to as the normal position shown in FIGS. 1 and 3. Thus, cylinder 75 serves as a stop, biasing the sector plate in the desired angular position to in turn, by means of pin 81, bias the arms 53 in their desired angularly downwardly directed orientation shown in FIGS. 1 and 3. With the fluid exhausted from cylinder 75, the small bias of the spring mounted therein is effective to retract piston rod 78 and thereby sector plate 80 to permit lowering of the freely suspended arms 53 by gravity.

A pair of laterally spaced switch actuating levers 82 and 83 are rigidly secured to shaft 52 for rotation therewith and extend radially outwardly therefrom. These levers 82 and 83 are circumferentially spaced apart from each other and are adapted to engage actuators 84 and 85, respectively, to activate limit switches LS-3 and LS-4 upon rotation of shaft 52 for a purpose hereinafter more fully explained.

Figure 2:
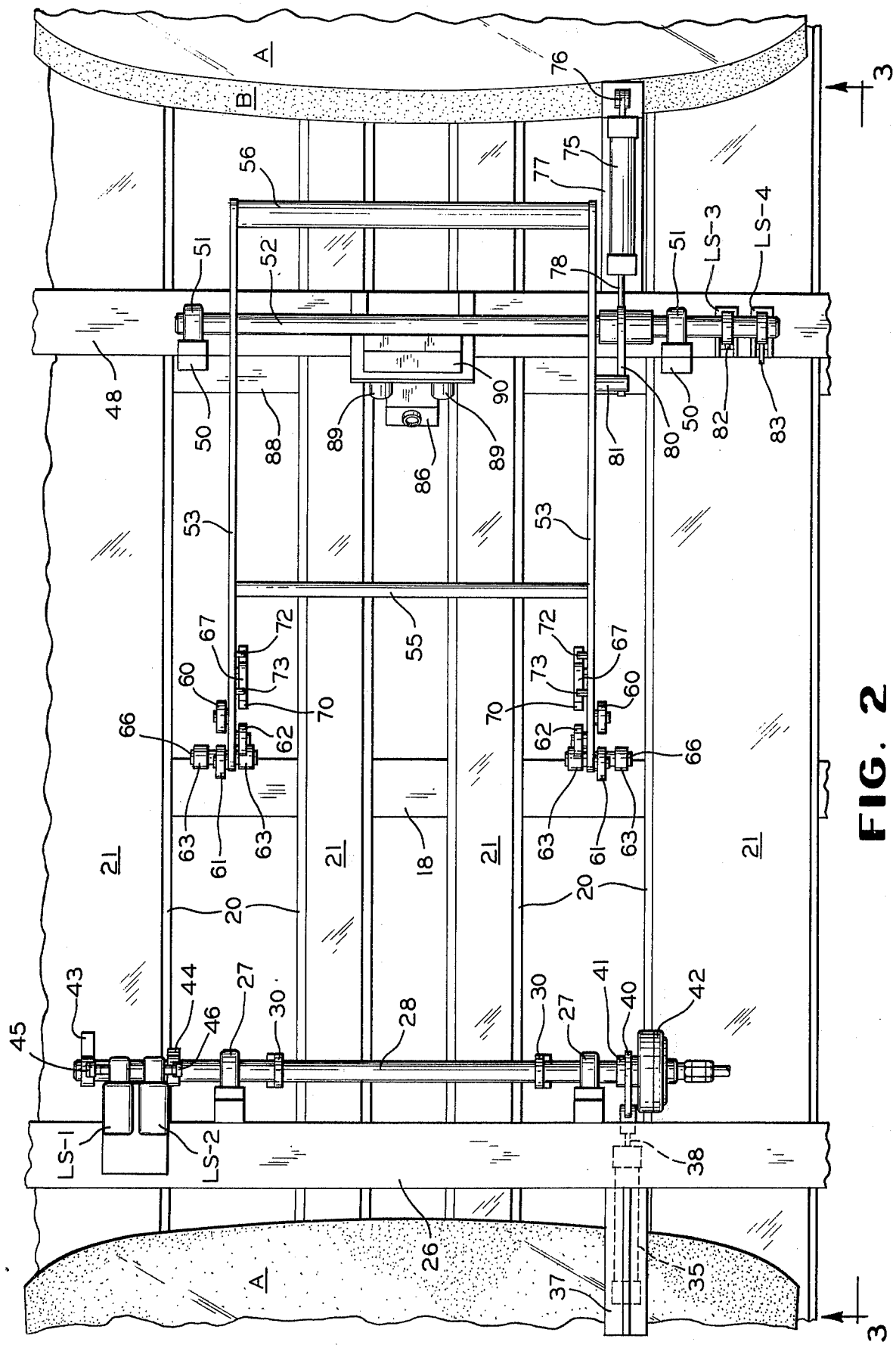
FIG. 2 is a fragmentary top plan view, on an enlarged scale, of the turnover apparatus embodied in the apparatus of FIG. 1.
Figure 3:
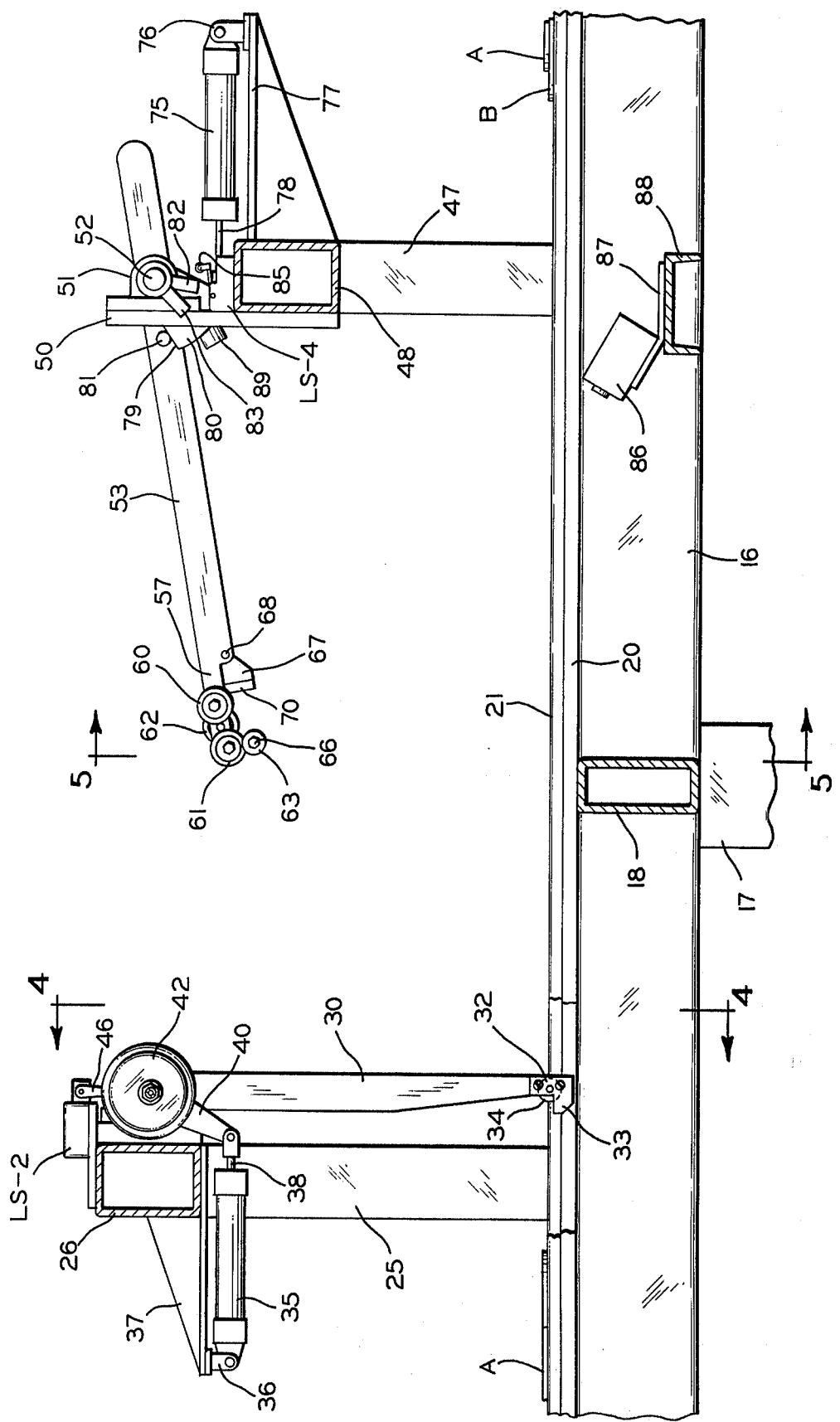
FIG. 3 is a vertical sectional view taken along the line 3—3 of FIG. 2.

As best shown in FIGS. 2 and 3, a suitable light source in the form of a projector lamp 86, mounted on a bracket 87 secured to a cross member 88, is provided for emitting a light beam adapted to be reflected from a vertically disposed sheet and received on either of a pair of photoelectric cells 89 mounted on a photoelectric terminal box 90 secured to cross support member 48.

The control means for controlling the sheet turnover cycle includes an electrical system, illustrated diagrammatically in FIG. 11. This diagrammatic illustration also includes the three solenoid-operated three-way control valves V-1, V-2 and V-3 for controlling operating of cylinders 35, 75 and clutch 42, respectively, such control valves otherwise not being shown physically in any of the other views.

As shown in FIG. 11, operating current is supplied from a suitable source of power (not shown) through a power supply line comprising conductor leads 91 and 92. A manually operable main power switch 93 is included in the power line for introducing or interrupting current supply into the electrical system. A voltage sensor VS is included in a line 95 leading to the photoelectric cells 89 for sensitively detecting the voltage difference applied thereacross when photocells 89 are energized. A pair of normally open contacts 96 in line 97 and a pair of normally closed contacts 99 in line 104 are controlled by the voltage sensor VS. The remainder of the control circuit will be described in terms of its function in connection with the operation of the turnover apparatus through one cycle, described below. At the beginning of the turnover cycle, solenoid-operated control valves V-1 and V-3 are de-energized whereby the piston rod 38 of cylinder 35 is retracted and clutch 42 is de-energized whereby crank arm 40 is disengaged from shaft 28, allowing the arms 30 to be freely suspended in a vertical position. Also, the solenoid-operated control valve V-2 is energized causing the piston rod 78 of cylinder 75 to be extended to the extent necessary to position sector plate 80 and thereby the lowering arms 53 in their normal, slightly downwardly extending positions shown in FIGS. 1 and 3.

Figure 8:
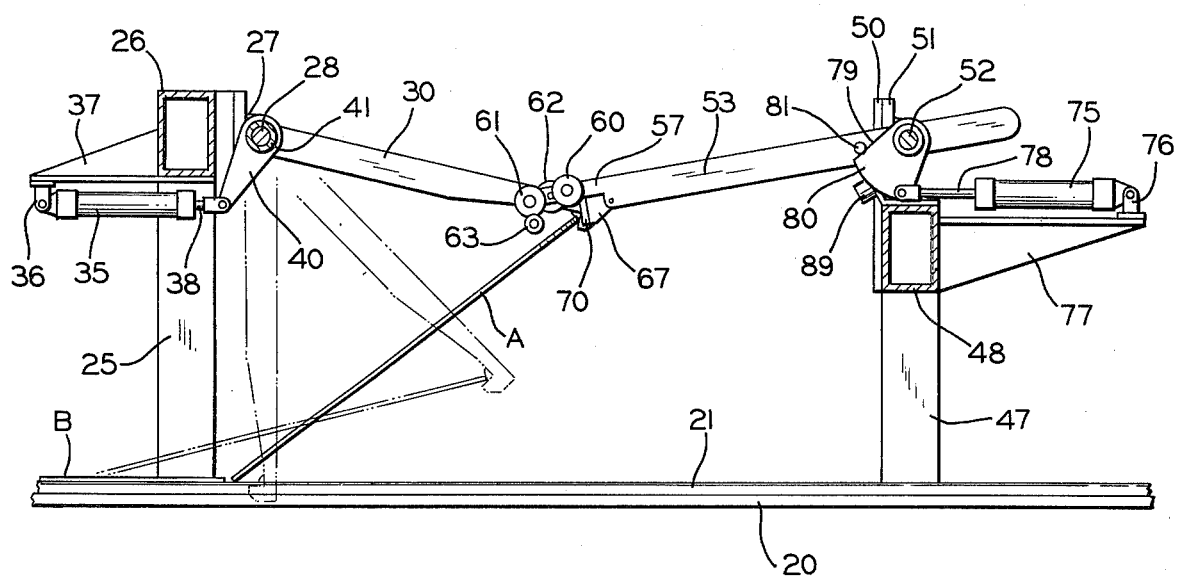
FIG. 8 is a side elevational view of the turnover apparatus, with various operative positions of the lifting arm being shown in broken lines.

In operation, sheets A and B are placed, either manually or mechanically, on continuous conveyor 11, as a pair, with sheet B being closely spaced from sheet A, the succeeding pair of sheets being placed a suitable distance from the first pair. After the parting material is applied to the upper exposed surfaces of one or both sheets A and B, the paired sheets advance to the area of turnover apparatus 12 where the leading edge of sheet A engages the hooks 32 of the lifting arms 30 above the fingers 33. As the sheet A continues to advance, the leading edge thereof is swung upwardly in an arcuate path about the sheet trailing edge which continues to travel horizontally on conveyor 11. As the leading edge of sheet A swings upwardly, it carries therewith the freely suspended lifting arms 30, which pivot about the horizontal pivotal axis defined by shaft 28. As the lifting arms 30 swing upwardly, the sheet leading edge engages the pads 70 of lowering arms 53, which then move upwardly along with the lifting arms 30 and the sheet leading edge. As noted earlier, the arms 53 are freely rotatable along with shaft 52 and, while they are prevented from moving downwardly by means of the stop provided by pin 81 engaging sector plate 80, they are free to move upwardly along with the leading edge of sheet A. As arms 30 and 53 are lifted from the position shown in FIG. 8 to the horizontal, the overlapping arcuate paths of pads 70 on arms 53 and fingers 33 on arms 30 cause the horizontal thrust load of the glass leading edge to be transferred to pads 70 leaving arms 30 resting freely on such leading edge as the arms reach a horizontal position. This shift of the glass edge with respect to hook 32 is facilitated by rollers 34. At the horizontal position of arms 30 and 53, as shown in phantom in FIG. 9, the lever 43 rotating along with shaft 28 engages and trips the actuator 45 of limit switch LS-1 (see also FIG. 12) to close normally open switch LS-1 in line 98 and open the normally closed switch LS-1 in line 104 (FIG. 11).

The closing of limit switch LS-1 in line 98 completes a circuit via power line 92, switch LS-1, line 98, normally closed switch LS-3 in line 100 and power line 91 to energize control relay CR-1. Energization of control relay CR-1 closes contacts CR-1 in lines 100, 101 and 102 to provide a holding circuit for control relay CR-1 and to energize the solenoid operated, three-way fluid control valves V-1 and V-3 respectively. Valve V-3 controls operation of air clutch 42 to effect engagement of crank lever 40 with shaft 28. Valve V-1 controls operation of cylinder 35 to extend piston rod 38 immediately after engagement of the clutch and swing crank lever 40 in a counterclockwise direction, as viewed in FIG. 9, to rapidly move the lifting arms 30 upwardly out of the way and out of engagement with the sheet leading edge, which is then supported solely on the lowering arms 53. The holding contacts CR-1 in line 100 maintain the control relay CR-1 energized via power line 92, contacts CR-1, normally closed switch LS-3 and power line 91 to maintain lifting arms 30 in this upper, out of the way position.

Figure 9:
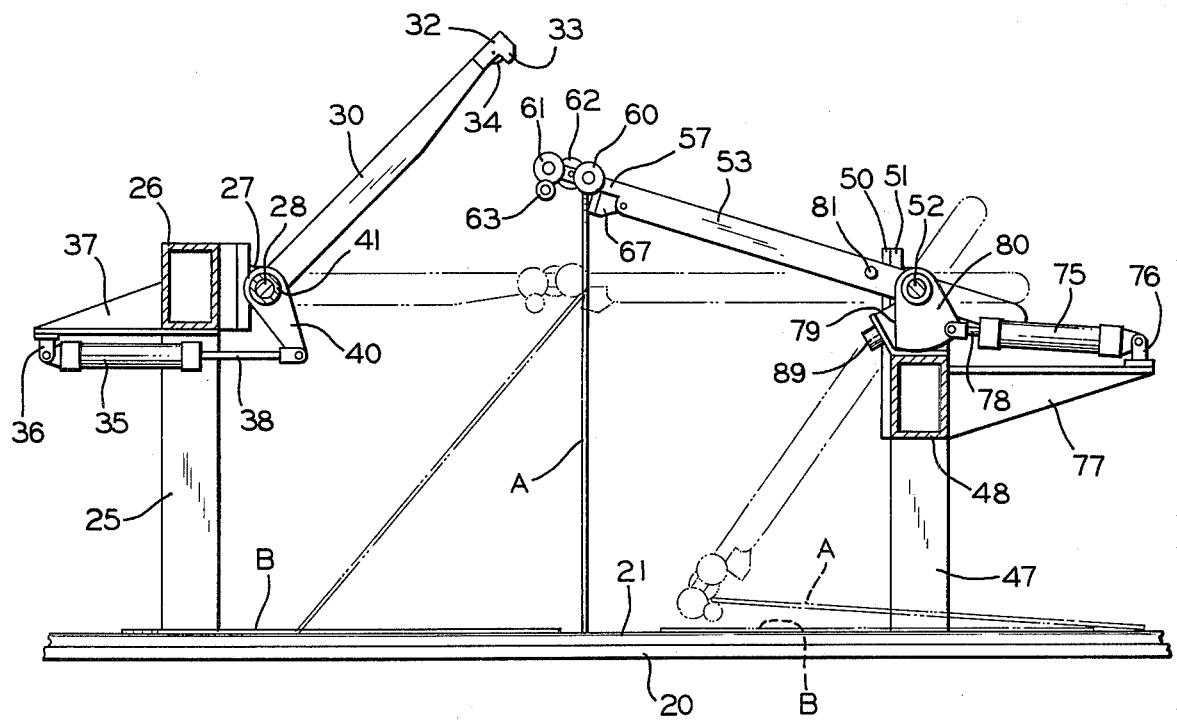
FIG. 9 is a view similar to FIG. 8, showing the turnover apparatus in use in handling relatively wide sheet material.

The simultaneous opening of normally closed switch LS-1 in line 104 opens contacts CR-2 in line 105 to de-energize control relay CR-2, in turn opening contacts CR-2 in line 106 to de-energize the solenoid operated, three-way fluid control valve V-2 to exhaust cylinder 75 and effect retraction of piston rod 78 and the associated sector plate 80, as shown in FIG. 9. Thus, the cylinder 75 and its bias on the arms 53 is disabled at the time the lifting arms 30 are elevated into their uppermost positions out of the way of the sheet leading edge.

As the leading edge of the sheet A continues to move upwardly in bearing engagement against pads 70, it causes dogs 67 to pivot about pins 68 to transfer such leading edge onto wheels 60. As sheet A passes the true vertical position, the former leading edge thereof begins to swing downwardly in an arcuate path while pivoting about the former trailing edge which continues to move horizontally on the endless belts 21 of conveyor 11 and now becomes the leading edge. During this arcuate movement past true vertical, the leading edge of sheet A rides smoothly on the peripheries of wheels 60, 62 and 61 until it comes to rest on the rollers 63. The coaction of pivotal dog 67 and wheels 60–62 offers easy sliding movement along each finger portion 57 with a minimum of friction during the transition of the sheet leading edge from pad 70 onto rollers 63 to minimize glass breakage which might otherwise occur should the leading edge become temporarily wedged or stuck in the area of fingers 57.

Figure 12:
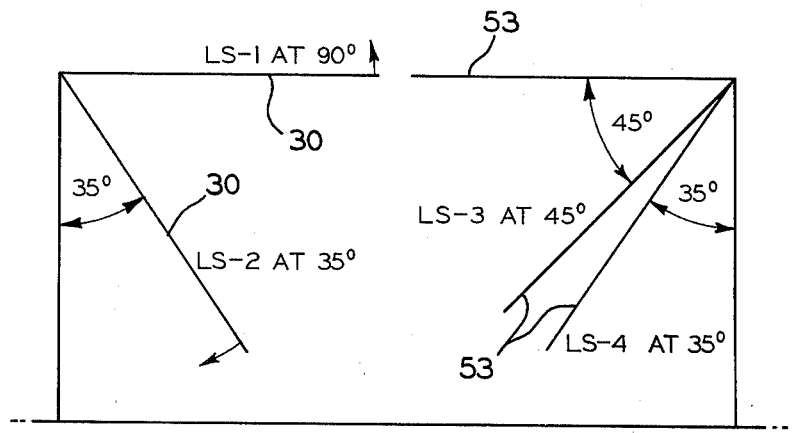

Since the bias afforded by cylinder 75 via sector plate 80 and pin 81 is now disabled, the arms 53 can be lowered along with the sheet A past its former biased position while sheet B continues to be advanced therebeneath on conveyor 11. When arms 53 reach a downwardly directed angular position of about 45° relative to a true horizontal, such as shown in FIG. 12, lever 82 on shaft 52 trips actuator 84 to open normally closed limit switch LS-3 in line 100 and de-energize control relay CR-1, in turn opening holding contacts CR-1 in line 100 and contacts CR-1 in lines 101 and 102. Consequently, the solenoid operated valves V-1 and V-3, controlling operation of cylinder 35 and air clutch 42, respectively, are deactivated, releasing the clutch 42 to allow arms 30 to drop by gravity and cause the shaft 28 formed integral therewith to rotate in a reverse, clockwise direction. When the lifting arms 30 reach a position about 35° from a true vertical, as shown in FIG. 12, the lever 44 mounted on shaft 28 trips actuator 46 to close normally open limit switch LS-2 to energize the solenoid operated control valve V-3 via (FIG. 11) power line 92, line 103, switch LS-2, line 108, a time delay relay TDR, contacts 110, line 102 and power line 91. Energization of valve V-3 activates clutch 42 to engage crank arm 40 with the shaft 28 to serve as a brake, retarding downward movement of arms 30 as they approach their lowermost position. After a predetermined time, say about .5 seconds, relay TDR times out to open the contacts 110 and de-energize control valve V-3 to deactivate clutch 42 and disengage crank arm 40 from shaft 28. Arms 30 then continue to fall into their normal, freely suspended vertical positions in readiness for the next cycle.

Lowering arms 53 continue to descend, following the now trailing edge of sheet A until it reaches its lowest position about 35° from a true vertical (FIG. 12) with the sheet trailing edge in close proximity to the upper surface of sheet B, as shown in FIG. 9, whereupon the lever 83 mounted on shaft 52 will trip actuator 85 to close normally open limit switch LS-4 and complete a circuit via power line 92, normally closed switch LS-1, line 104, switch LS-4, lines 111, 105 and power line 91 to energize control relay CR-2. Energization of control relay CR-2 closes contacts CR-2 in line 106 to complete a circuit via lines 92, 106 and 91 to energize the solenoid operated, three-way fluid control valve V-2 for pressurizing cylinder 75. This rotates lowering arms 53 in a clockwise direction, as viewed in FIG. 9, through piston rod 78, sector plate 80 and pin 81 and releases the trailing edge of sheet A, which falls a short distance onto the advancing sheet B. The lowering arms 53 are returned to their normal position about 15° below a true horizontal and maintained in this position by the continual energization of control relay CR-2 via holding contacts CR-2 in line 105. The stacked sheets A and B continue to be advanced on conveyor 11 and are subsequently handled in stacked pairs.

The above operation was described in connection with the handling of glass sheets having a width, i.e., leading edge to trailing edge, greater than the height of the arms 30 and 53 when such arms are disposed in the generally horizontal position shown in phantom in FIG. 9. It can be appreciated that when processing sheets having widths of lesser dimensions than the height of the horizontal disposition of arms 30 and 53, lifting arms 30 will not rise sufficiently to rotate shaft 28 to the extent necessary for actuating limit switch LS-1. In such instances, when the leading sheet A reaches a true vertical position, a light beam L (FIG. 10) emitted from the light source 86 located beneath conveyor 11 will be reflected from the sheet A onto either or both of the photoelectric cells 89. The purpose of utilizing two laterally spaced cells 89 with a wide projected beam L is to assure the reception of the beam L in the event a sheet is laterally misaligned with respect to the longitudinal axis of conveyor 11.

The voltage sensor VS in line 95 is activated by the higher voltage applied thereacross when the light beam L strikes either or both cells 89 to close normally open contacts 96 in line 97 and open normally closed contacts 99 in line 104 to perform the same function otherwise performed by limit switches LS-1 in lines 98 and 104, i.e., energize control relay CR-1 and de-energize control relay CR-2. This results in the rapid sheet release and raising of lifting arms 30 and the disabling of the bias imposed on lowering arms 53 by cylinders 75 through the sector plate and pin arrangement. The turnover cycle is completed in the same manner described above in connection with the wider sheets.

The low voltage required for the projector lamp 86 is provided by a step-down transformer 112 from line 107 to the lamp circuit 113. It should be noted that the projector lamp 86 may be continually energized regardless of glass sheet size because, when processing the wider sheets, control relays CR-1 and CR-2 will already have been energized and de-energized, respectively, by LS-1 when the light beam L impinges on photocells 89.

The range of sheet sizes that the apparatus of this invention can accommodate may vary widely. For example, the apparatus shown and described in the illustrated embodiment can handle sheets having width sizes ranging from 13 inches to 38 inches with the photocell control being operative for sheet widths up to 20 inches and the limit switches LS-1 being operative for sheet widths greater than 20 inches. The above range of width sizes is exemplary only, it being understood that the apparatus of this invention can accommodate any range of sheet sizes, as desired. While the control of limit switch LS-1 is shown associated with shaft 28 and lifting arms 30, it can be associated with the shaft 52 and lowering arms 53 for actuation upon a predetermined angular position of the latter. Moreover, it can be adjusted to effect activation of switch LS-1 at some angle of arms 53 above the horizontal, if desired.

Also, while two lifting arms 30 and two lowering arms 53 have been shown and described in the illustrative embodiment, it should be appreciated that only one of each is required in accordance with the principles of this invention.

From the foregoing, it is apparent that the objects of the present invention have been fully accomplished. An improved turnover apparatus is provided for automatically turning and inverting one sheet of a pair of sheets onto the other of such pair in a continuous production line operation regardless of the variation in sizes between successive paired sheets. By the provision of control means responsive either to the disposition of the lifting or lowering arms or the true vertical attitude of the sheet being processed, the same apparatus can be used to accommodate successive differently sized paired sheets without interruption for adjustments.

It is to be understood that the form of the invention herewith shown and described is to be taken as an illustrative embodiment only of the same, and that various changes in the shape, size and arrangement of parts may be resorted to without departing from the spirit of the invention.

I claim:

1. A sheet turnover apparatus comprising: a conveyor for supporting and moving horizontally disposed sheets in a horizontal path; means along said path for lifting the leading edge of the sheet upwardly off said conveyor while the trailing edge of said sheet remains in contact and moves with said conveyor to effect pivotal movement of said sheet in an arcuate path about said trailing edge; lowering means along said arcuate path for receiving the lifted edge of said sheet during movement thereof in said arcuate path and subsequently lowering said sheet when advanced past a true vertical onto said conveyor in an inverted position; and power means for disengaging said lifting means from said sheet and quickly moving said lifting means out of said arcuate path allowing said sheet to be supported solely on said lowering means during completion of said movement of said sheet in said arcuate path.

2. A turnover apparatus according to claim 1, wherein said lifting means comprises at least one arm pivotally mounted above said conveyor and normally extending vertically downwardly into said horizontal path; and control means operable upon movement of said arm into a predetermined position for actuating said power means.

3. A turnover apparatus according to claim 2, wherein said lifting arm is provided at the lower end thereof with a hook terminating in means engageable with the leading edge of a sheet moving along said conveyor for lifting said sheet upwardly in said arcuate path about the trailing edge thereof as said sheet continues to move with said conveyor.

4. A turnover apparatus according to claim 1, wherein said lowering means comprises at least one freely suspended, lowering arm pivotally mounted above said conveyor; and means for biasing said lowering arm in a downwardly directed position extending at a slight angle relative to a true horizontal plane extending through the pivot axis of said lowering arm.

5. A turnover apparatus according to claim 4, including power means activated by said control means and operable with said first mentioned power means for disabling said lowering arm biasing means to permit free movement of said lowering arm along with said sheet during the remainder of its pivotal movement in said arcuate path.

6. A turnover apparatus according to claim 5, wherein said control means includes means responsive to a first predetermined position of said lowering arm in its arcuate path for disabling said first mentioned power means to release said lifting means in preparation for a succeeding cycle.

7. A turnover apparatus according to claim 5, wherein said control means includes means responsive to a second predetermined position of said lowering arm in its arcuate path for returning said lowering arm to the initial biased position thereof, allowing said sheet to drop off said lowering arm a short distance onto said conveyor.

8. A turnover apparatus according to claim 4, wherein said lowering arm is provided adjacent the distal end thereof with a pivotal abutment member for receiving the lifted edge of said sheet from said lifting means during the upward movement of said sheet in said arcuate path.

9. A turnover apparatus according to claim 8, wherein said lowering arm has an end portion provided with at least one roller spaced from said abutment member for supporting said sheet leading edge during the lowering thereof in said arcuate path.

10. A turnover apparatus according to claim 9, including anti-friction means mounted on said lowering arm end portion for facilitating movement of said sheet leading edge from said abutment member to said rollers.

11. A turnover apparatus according to claim 1, including control means responsive to a given disposition of said sheet in said arcuate path for actuating said power means.

12. A turnover apparatus according to claim 1, wherein said lifting means comprises at least one arm pivotally mounted above said conveyor and normally extending downwardly into said horizontal path; said lowering means comprises at least one freely suspended lowering arm pivotally mounted above said conveyor; and means for biasing said lowering arm in a downwardly directed position extending at a slight angle relative to a plane extending through the pivot axes of said lifting arm and said lowering arm respectively.

13. A turnover apparatus according to claim 12, including control means operable upon movement of either of said arms into a predetermined position for actuating said power means.

14. A turnover apparatus according to claim 12, including control means responsive to a given disposition of said sheet in said arcuate path for actuating said power means and disabling said biasing means.

15. A sheet turnover apparatus comprising: a conveyor for supporting and moving horizontally disposed sheets in a horizontal path; at least one lifting arm pivotally mounted above said conveyor and suspended vertically into said path for lifting the leading edge of a sheet upwardly off said conveyor while the trailing edge of said sheet remains in contact with said conveyor to effect pivotal movement of said sheet in an arcuate path about said trailing edge; lowering means along said arcuate path for receiving the lifted edge of said sheet during movement thereof in said arcuate path; means for rapidly disengaging said lifting arm from said sheet allowing the latter to be supported solely on said lowering means during completion of said movement of said sheet in said arcuate path; and control means having means selectively responsive to the position of said lifting arm and said sheet for actuating said lifting arm disengaging means.

16. A turnover apparatus according to claim 15, wherein said lowering means comprises at least one freely suspended, lowering arm pivotally mounted above said conveyor; and means for biasing said lowering arm in a downwardly directed position extending at a slight angle relative to a horizontal plane extending through the axis pivot of said lowering arm.

17. A turnover apparatus according to claim 16, including means activated by said selectively responsive means for disabling said lowering arm biasing means to permit free movement of said lowering arm along with said sheet during the remainder of its pivotal movement in said arcuate path.

18. A turnover apparatus according to claim 17, wherein said control means includes means responsive to a first predetermined position of said lowering arm in its arcuate path for disabling said first mentioned power means to release said lifting means in preparation for a succeeding cycle.

19. A turnover apparatus according to claim 18, wherein said control means includes means responsive to a second predetermined position of said lowering arm in its arcuate path for returning said lowering arm to the initial biased position thereof, allowing said sheet to drop off said lowering arm a short distance onto said conveyor.

* * * * *